(12) United States Patent
Müller et al.

(10) Patent No.: US 7,559,336 B2
(45) Date of Patent: Jul. 14, 2009

(54) PRESSURE LIMITING VALVE

(75) Inventors: Eric Müller, Kaiserslautern (DE); Manfred Homm, Bühl-Neusatz (DE); Reinhard Stehr, Bühl (DE)

(73) Assignee: LuK Lamellen und Kupplungsbau Beteiligungs KG, Bühl (DE)

( * ) Notice: Subject to any disclaimer, the term of this patent is extended or adjusted under 35 U.S.C. 154(b) by 0 days.

(21) Appl. No.: 11/801,346

(22) Filed: May 9, 2007

(65) Prior Publication Data
US 2007/0272889 A1 Nov. 29, 2007

Related U.S. Application Data

(63) Continuation of application No. PCT/DE2005/001844, filed on Oct. 15, 2005.

(30) Foreign Application Priority Data
Nov. 9, 2004 (DE) .................. 10 2004 053 983

(51) Int. Cl.
*G05D 11/00* (2006.01)
(52) U.S. Cl. ............................. 137/110; 251/63
(58) Field of Classification Search .............. 251/63; 137/625.6–625.64, 501, 101, 110
See application file for complete search history.

(56) References Cited

U.S. PATENT DOCUMENTS

| | | | | |
|---|---|---|---|---|
| 3,381,698 A | * | 5/1968 | Henderson et al. | 137/85 |
| 3,785,614 A | * | 1/1974 | Enomoto | 251/63 |
| 3,872,883 A | | 3/1975 | Bianchetta et al. | 137/491 |
| 3,979,908 A | * | 9/1976 | Alderson | 137/101 |
| 4,254,687 A | * | 3/1981 | Alexander | 137/110 |
| 4,875,501 A | * | 10/1989 | Ichihashi et al. | 137/625.64 |

FOREIGN PATENT DOCUMENTS

| | | |
|---|---|---|
| DE | 28 27 128 A1 | 1/1980 |
| DE | 33 08 146 A1 | 9/1984 |
| DE | 197 40 711 A1 | 3/1999 |
| FR | 1 168 077 A | 12/1958 |

* cited by examiner

*Primary Examiner*—John Rivell
*Assistant Examiner*—Andrew J Rost
(74) *Attorney, Agent, or Firm*—Alfred J. Mangels

(57) ABSTRACT

A pressure limiting valve having a spool with raised spool lands. The spool is slidably received in a spool bore having inflow and outflow grooves that form control edges. The valve has two control edges, and a hydraulic resistance is connected in series with one of the control edges. Increasing static pressure losses at the control edges during flow, so-called flow forces, can be offset by an increasing back pressure on the valve spool, which is produced by the hydraulic resistance.

9 Claims, 6 Drawing Sheets

PRESSURE LIMITING VALVE

CROSS-REFERENCE TO RELATED APPLICATION

This is a continuation of International Application Ser. No. PCT/DE2005/001844, with an international filing date of 15 Oct. 2005, and designating the United States, the entire contents of which is hereby incorporated by reference to the same extent as if fully rewritten.

BACKGROUND OF THE INVENTION

1. Field of the Invention

The present invention relates to a valve, in particular a pressure limiting valve having a spool with spool lands, which form control edges with inflow and outflow grooves in a spool bore/guide.

2. Description of the Related Art

Such valves are known. The valve has, for example, a spool land that is subjected on one side to a pilot pressure and on the other side to a pressure of a main hydraulic system. If the pressure force of the system pressure exceeds the pressure force of the pilot pressure, then the spool begins to move and allows an opening to form at a groove, whereby a flow arises at the control edge which partially reduces the static pressures that previously existed there in the closed state. One also speaks here of the effect of a so-called flow force that results from the now missing pressure force components. With increasing flow at the control edge, additional pressure force components in the opening direction are reduced by the flow, so that the system pressure must rise further in order to open the valve spool further against the constant pilot pressure. In such pressure limiting valves, that results in a rising characteristic curve for the system pressure caused by the increasing volumetric flow. One also speaks here of a rise in the pressure characteristic due to so-called flow forces. The rise of the pressure characteristic thereby results in an increasing pressure rise in the system, which is actually not wanted. Ideally, one would like to achieve constant system pressure across the increase in volumetric flow through the valve.

An object of the present invention is therefore to provide a valve, in particular a pressure limiting valve, with which the pressure rise of the characteristic curve is reduced and the pressure characteristic is thereby improved.

SUMMARY OF THE INVENTION

The object is achieved by a valve, in particular a pressure limiting valve, having a spool with raised spool lands, which together with a spool bore/guide having inflow and outflow grooves forms control edges, the valve having two control edges and a hydraulic resistance that is connected in series with one of the control edges.

That has the advantage that increasing static pressure losses at the control edges during flow, i.e., so-called flow forces, can be offset by an increasing back pressure on the valve spool, which is produced by the hydraulic resistance.

A valve is preferred in which the hydraulic resistance is connected in series with the first control edge. Also preferred is a valve in which the hydraulic resistance is connected before or after the first control edge in the direction of flow.

A valve in accordance with the invention is distinguished by the fact that the second control edge in the direction of flow is connectable parallel to the first control edge. Also preferred is a valve in which the second control edge in the direction of the opening motion opens later than the first control edge.

That has the advantage that the first control edge opens first, and the influence of flow force occurring there (pressure losses at the spool surface) is offset by the back pressure of the hydraulic resistance. As the volumetric flow increases further, and at the subsequent opening of the second control edge, the volumetric flow over the second control edge will occur with a correspondingly lower pressure difference without additional pressure losses, due to the hydraulic resistance. The pressure losses over the second control edge thus remain low, and a pressure rise of the characteristic curve, as in the case of conventional pressure limiting valves, is thereby reduced.

A valve in accordance with the invention is distinguished by the fact that the hydraulic resistance is designed in the form of an orifice plate. That has the advantage that temperature influences on the hydraulic medium, which are manifested as changes in the viscosity of the medium, do not significantly influence the pressure drop that occurs at the orifice plate.

Another valve is distinguished by the fact that the hydraulic resistance is designed in the form of a throttle. That enables temperature influences, and hence viscosity influences, to be used meaningfully for particular effects, if that is desired for the regulating strategy.

Furthermore, a valve in the form of a slide valve is preferred.

Also preferred is a valve which is pilot-operable by a pilot pressure. A valve is also preferred in which the spool lands have pressure-affected surfaces of varying sizes. That has the advantage that high system pressures, for example, can be regulated with a low pilot pressure.

BRIEF DESCRIPTION OF THE DRAWINGS

The invention will now be described on the basis of the following drawing figures.

DESCRIPTION OF THE PREFERRED EMBODIMENTS

Figure 1:
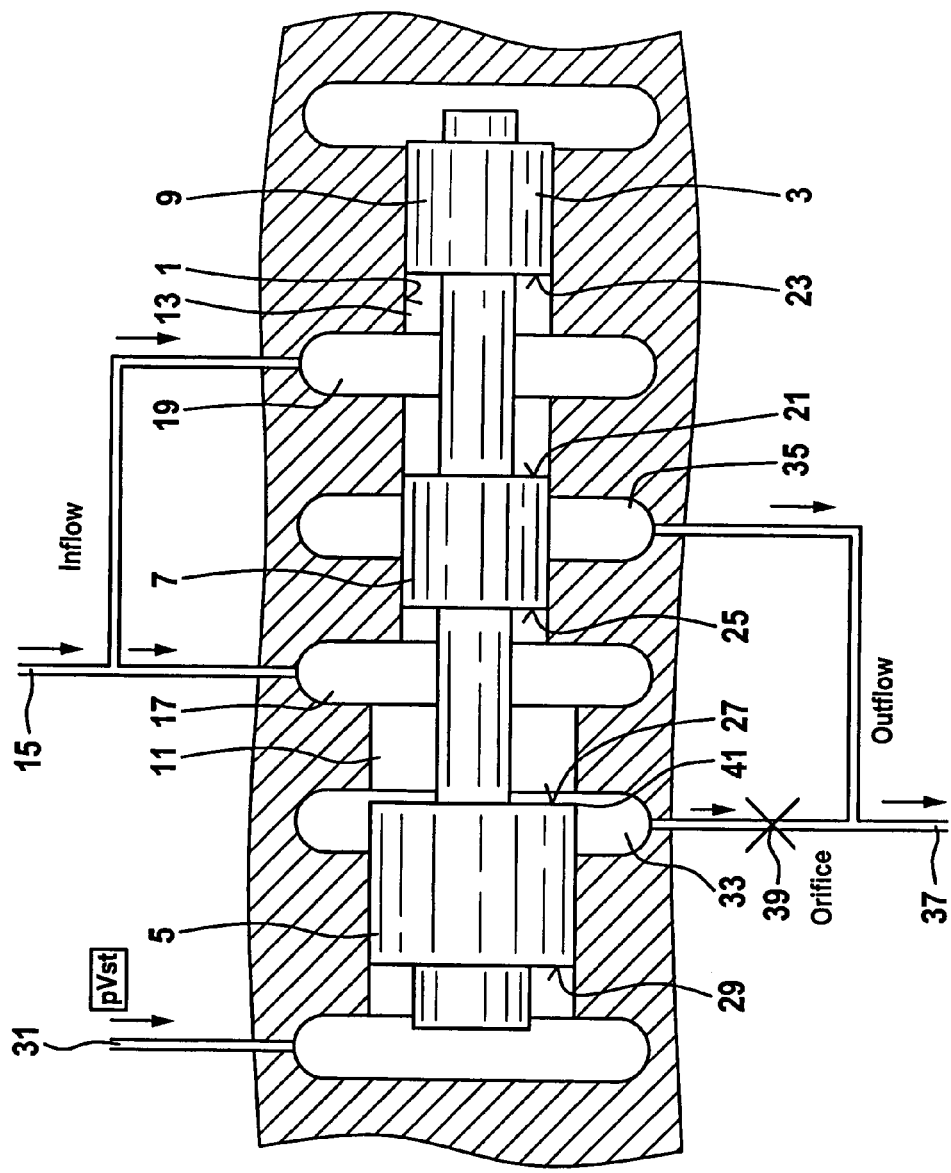
FIG. 1 shows an embodiment of a pressure limiting valve in accordance with the invention.

FIG. 1 shows an embodiment of a pressure-limiting valve in accordance with the invention. A spool 3 having three spool lands 5, 7 and 9 is guided in a spool bore 1. Spool bore 1 has a larger diameter in region 11 than in region 13. Likewise, spool land 5 is larger in diameter than spool lands 7 and 9. Within a valve housing that is not shown directly here, an inflow line 15 is divided into a first infeed chamber 17 and a second infeed chamber 19, each in the form of circumferential grooves. When system pressure is present in inflow line 15, the forces of the system pressure acting on pressure-affected surface 21 of spool land 7 and on pressure-affected surface 23 of spool land 9 will cancel each other out. The system pressure in infeed chamber 17, which acts on the smaller area pressure-affected surface 25 of spool land 7 and on the larger area pressure-affected surface 27 of spool land 5, produces a pressure differential force in the valve opening direction. That opening force is offset by a pilot pressure (pVst), which acts through conduit 31 on the entire pressure-affected surface 29 of the larger area spool land 5, so that a large pressure-affected surface 29 with a low pilot pressure in the region of the feed line 31 compensates for a small differential surface between pressure surfaces 27 and 25, under a higher system pressure. Two outflow chambers 33 and 35 of the valve join together again in a common outfeed 37, wherein there is arranged a hydraulic resistance 39, for example in the form of an orifice plate, positioned downstream of outflow chamber 33. When control edge 41 of spool land 5 is shifted axially, and hence when there is a flow through the hydraulic resistance 39 corresponding to the through volumetric flow, hydraulic resistance 39 produces a back pressure in outflow chamber 33. The effects of axial movement of control edge 41 are illustrated in FIGS. 2a, 2b, and 2c.

Figure 2A:
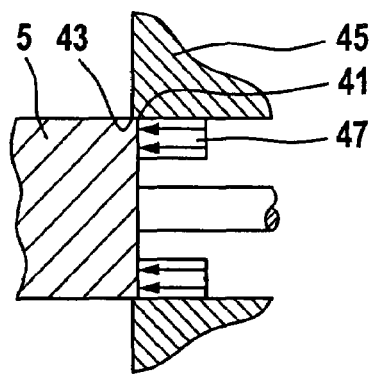
FIGS. 2a, 2b, and 2c show the different effects of the static and dynamic pressure forces acting on the valve spool.
Figure 2B:
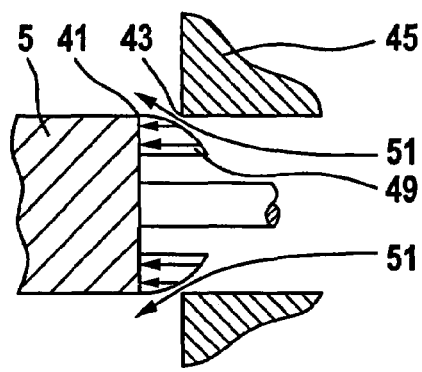

FIG. 2a shows valve spool land 5 of FIG. 1 in the closed state. Control edge 41 of spool land 5 overlaps control edge 43 of housing 45 by a certain amount, and thus flow from first infeed chamber 17 shown in FIG. 1 is blocked due to the differential surface action. Between pressure surface 25 of spool land 7 and pressure surface 27 of spool land 5 there is an effective static pressure differential profile 47, which causes a force to act on the spool in the opening direction of the valve by means of the system pressure. That opening force is held in equilibrium by the pressure force of the pilot pressure acting on pressure surface 29 shown in FIG. 1. If the system pressure in the inflow line of the valve rises further, so that the effective pressure differential force of the pressure differential profile 47 can overcome the pressure force of the pilot pressure then control edge 41 will move to the left, away from control edge 43 of the housing, as shown in FIG. 2b. That results in a flow between control edges 41 and 43, illustrated by arrow 51, as a result of which the static pressure differential 47 previously operating at the flow region is reduced, and, for example, an effective residual pressure profile 49 remains. Since the static pressure forces are reduced in the flow region, the static pressure and hence the system pressure must increase in the non-flow region internally on the spool, so that the spool can maintain or even increase its opening position. That results in a so-called unwanted pressure rise across the volumetric flow, which can be represented by measurement in a pressure limiting valve characteristic curve.

Figure 2C:
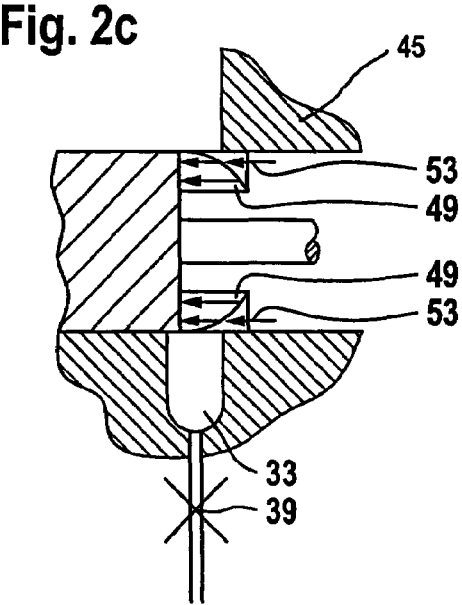

In accordance with the invention, the function of hydraulic restriction 39 of FIG. 1, such as an orifice plate, now takes effect, as shown in FIG. 2c. As the through-flow increases, the hydraulic resistance 39 produces a back pressure in outflow chamber 33, which is added to the previous residual pressure profile 49 shown in FIG. 2b in the form of an additional pressure profile 53, and thus compensates for the pressure losses that occur during opening, when there is through-flow in accordance with FIG. 2b, compared to FIG. 2a. That means that in accordance with the invention the system pressure does not have to rise further to enable the valve spool to open the valve, since that is realized by the additional back pressure of the hydraulic resistance 39. Only when the opening between the control edges 43, 41, and hence also the back pressure upstream of the hydraulic resistance 39, becomes larger than desired, is a second control edge of the valve opened, as shown in FIG. 3.

Figure 3:
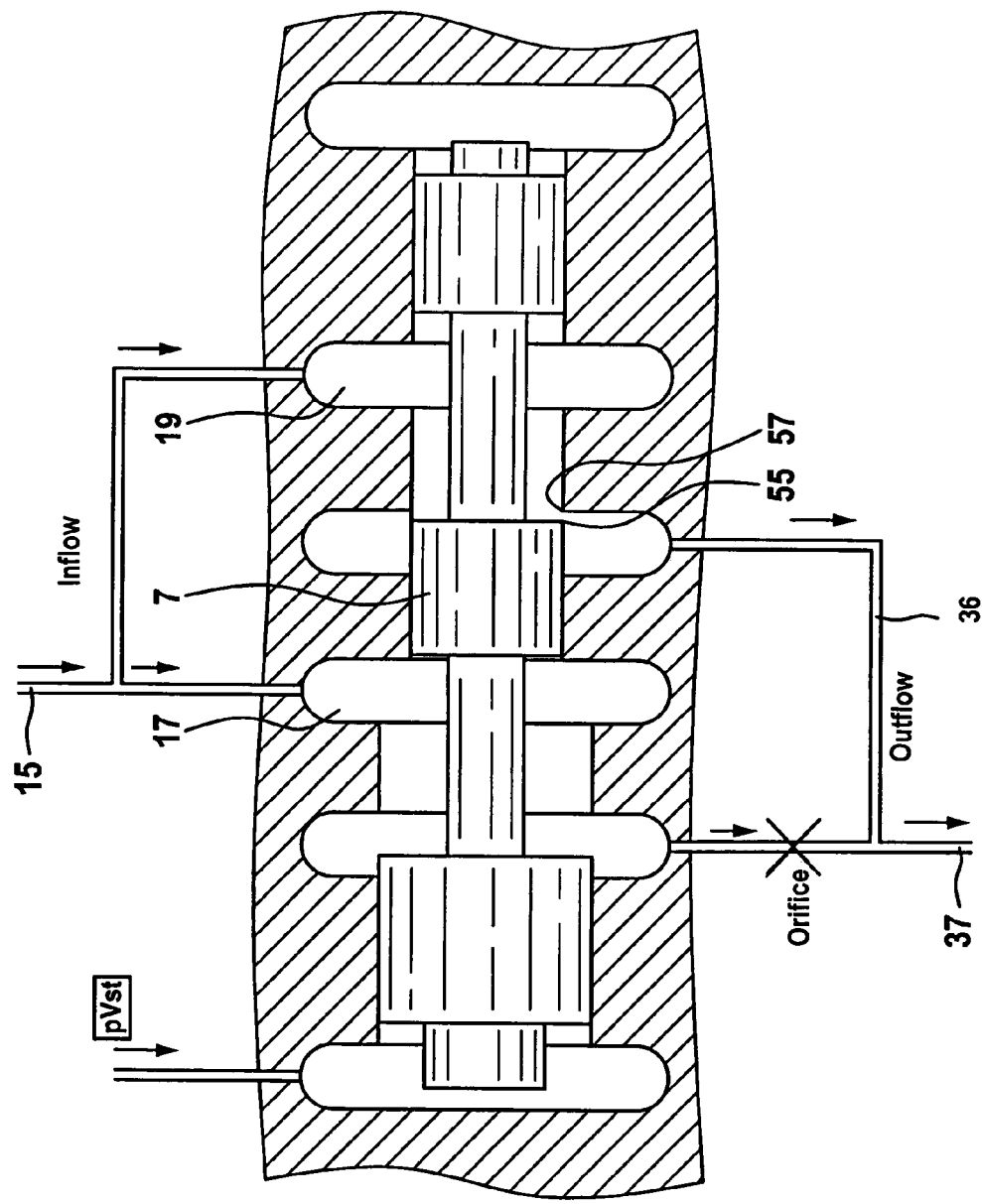
FIG. 3 shows the valve of FIG. 1 with both control edges opened.

FIG. 3 differs from FIG. 1 in that an opening appears at spool land 7 between control edge 55 of spool land 7 and control edge 57 of the housing, which now enables an additional volumetric flow via second infeed chamber 19, parallel to the volumetric flow via first infeed chamber 17. All other functions correspond also to the functions of the structure shown in FIG. 1, and will not be mentioned again to avoid repetitions. The additional volumetric flow via second infeed chamber 19 and control edges 55, 57 into outlet conduit 36 does not flow through any resistance, and hence does not produce any significant additional pressure increase, so that a low-resistance volumetric flow parallel to the volumetric flow path shown in FIG. 1 occurs here.

Figure 4:
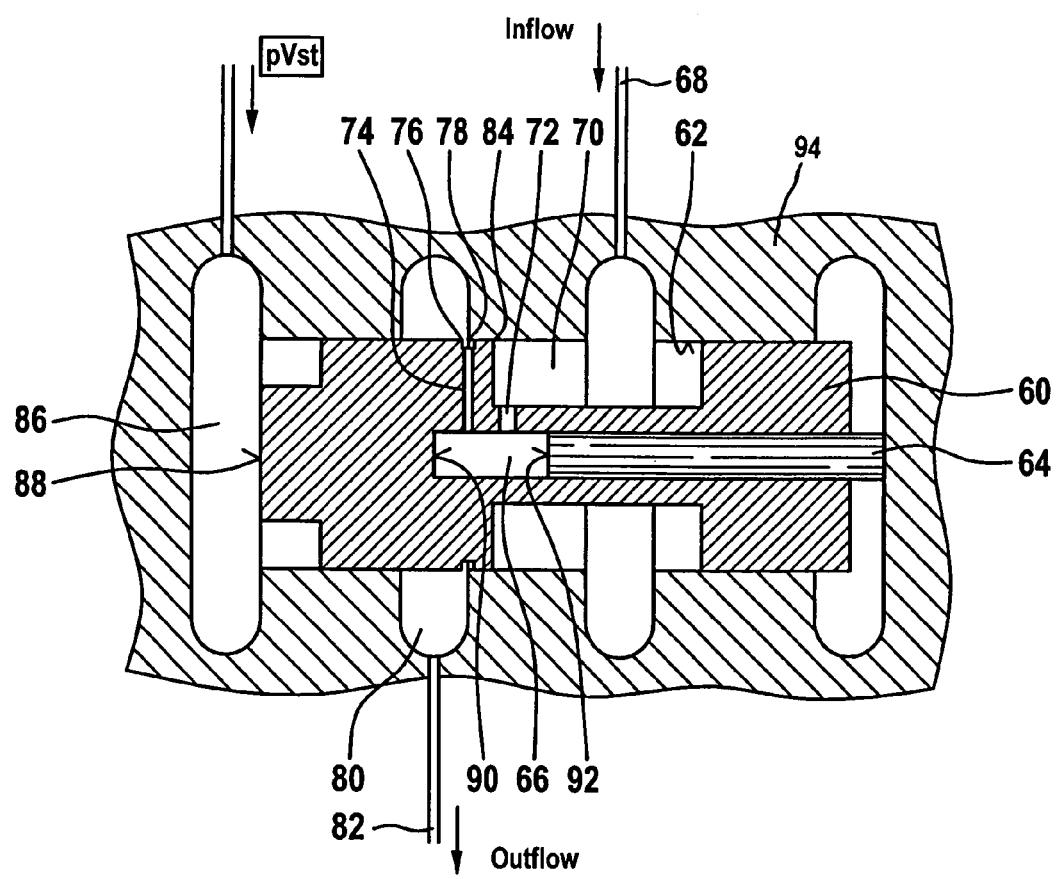
FIG. 4 shows a second embodiment of a pressure limiting valve in accordance with the invention.

FIG. 4 shows a different embodiment of a pressure limiting valve in accordance with the invention. A valve spool 60 of constant outside diameter is guided within a spool bore 62. In addition, spool 60 has a guide pin 64, which is guided in an inner axial bore 66 within spool 60. The hydraulic medium passes under system pressure through an inflow line 68 into region 70, and through an opening 72 into inner bore 66 of spool 60. The hydraulic fluid is then conducted from spool bore 66 through a narrow bore 74 acting as a resistance, to a control edge 76 formed on the spool, which interacts with a control edge 78 of the housing 94. From the control edges 76 and 78 the fluid then passes into the outflow chamber 80, and thus into the outfeed conduit 82. An additional opening motion of the spool to the left as viewed in FIG. 4, causes a second control edge 84 to move past the control edge 78 of the housing 94 to provide an opening therebetween, and thereby allows a second volumetric flow to flow from region 70 into outflow chamber 80, while the control edge region 76 of the spool is now completely opened relative to control edge 78, and consequently no additional change in flow occurs at control edge 76 where the fluid flows through the resistance provided by narrow bore 74. Thus in this valve design as well a first control edge 76 is utilized, and parallel to it, with an additional opening motion, a second control edge 84, which results in the same effects as in the case of the valve design shown in FIG. 1. The pilot pressure in chamber 86 acting on the large valve spool surface 88, which corresponds to the entire diameter of valve spool 60 and spool bore 62, is offset by the system pressure within the spool inner bore 66 acting on surface 90, which thus produces the opening force for the valve spool. The same pressure that acts on the surface 92 of guide pin 64 is effective within the valve housing 94, and has no influence on the opening force acting on spool 60.

Figure 5:
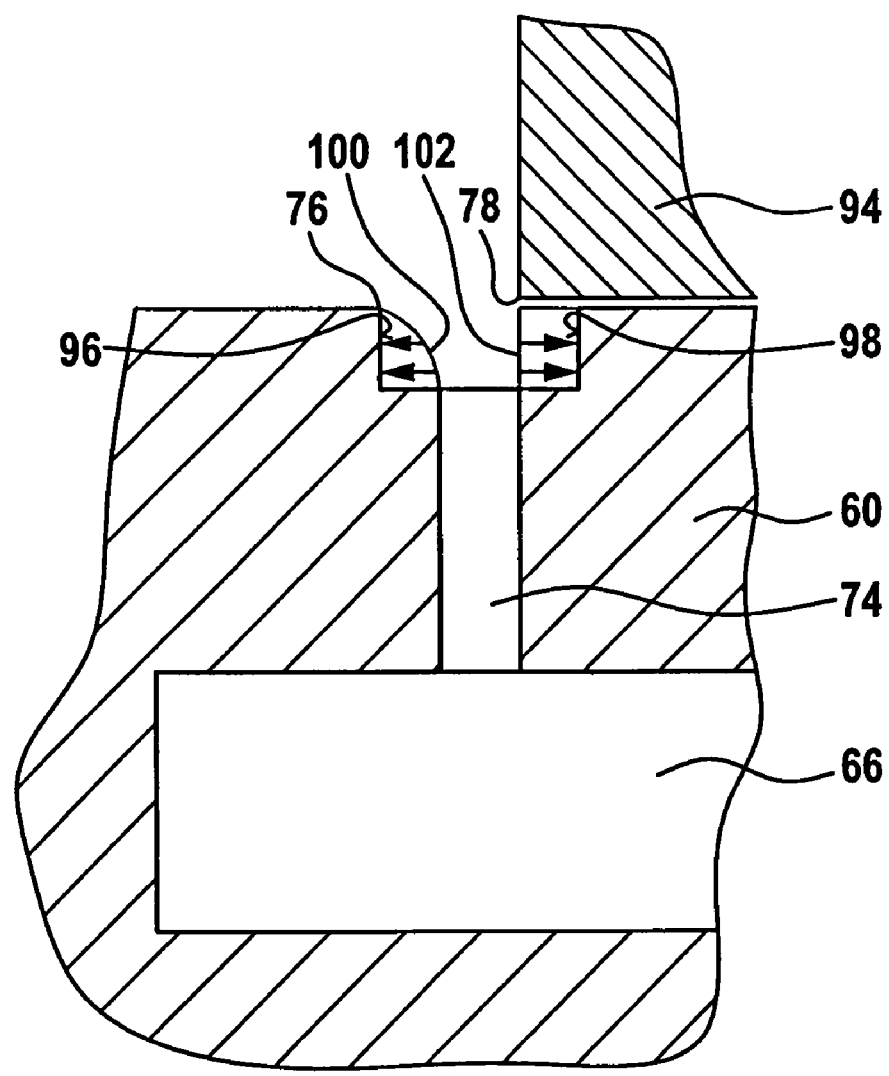
FIG. 5 shows an enlarged view of the control edges of FIG. 4 under the influence of flow forces.

The effect of the flow force, that is, the loss of static pressure force during through-flow at the control edges 76 of the spool and 78 of the housing, is shown in the enlarged view of FIG. 5. Control edge 76 of spool 60 has moved away from control edge 78 of housing 94, so that the hydraulic fluid flows out of spool inner bore 66 of spool 60 through narrow bore 74 to control edge edges 76 and 78. When those control edges were in the closed condition, blocking flow through narrow bore 74, the pressures acting on the control edge surfaces 96 and 98 at the outlet of narrow bore 74 offset each other, and thus did not produce any additional axial force on spool 60. In the open condition shown in FIG. 5 the static pressure at the control edge 76 is reduced at the edge during flow, so that a pressure profile 100 builds up which loses static pressure force compared to pressure profile 102, and hence would have to be offset by a magnification of the system pressure. But since the volumetric flow previously flowed through the narrow bore 74, and thus the static pressure has been greatly reduced, a high static pressure will no longer prevail at the control edges 96 and 98 as when there is less flow, and thus the actual level of corresponding flow forces will be significantly lower. Thus, the effective flow forces at control edge 76 are reduced by the pressure loss produced earlier by the resistance provided by narrow bore 74.

Figure 6:
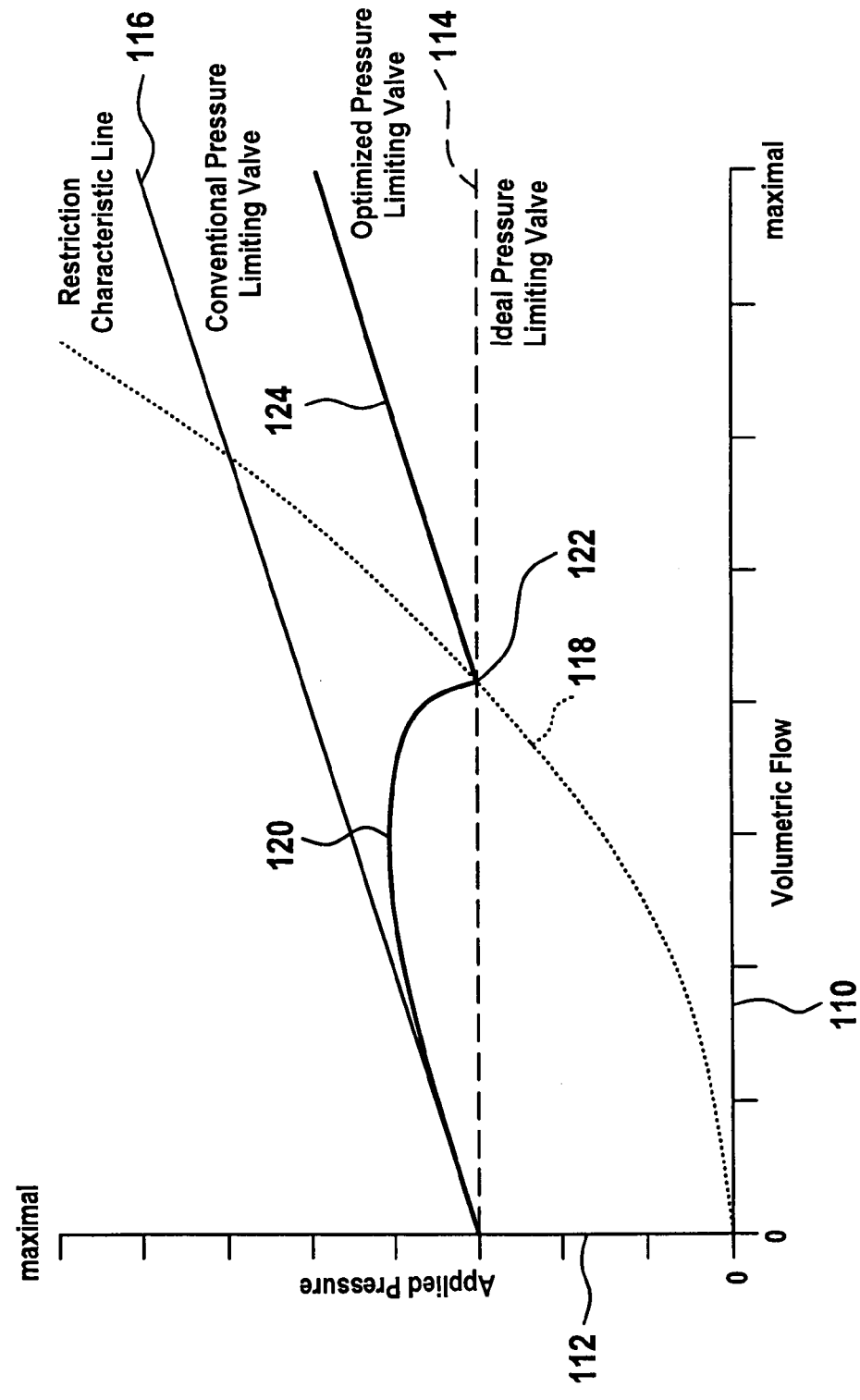
FIG. 6 shows the comparison of the pressure limiting valve characteristic curves between a conventional pressure limiting valve, the optimized pressure limiting valve and an ideal pressure limiting valve.

FIG. 6 shows the corresponding characteristic curves of a conventional pressure limiting valve, of the optimized pressure limiting valve, and the theoretical characteristic curve of an ideal pressure limiting valve. At the same time, the corresponding applied system pressure 112 is plotted against the volumetric flow 110. In an ideal pressure limiting valve, the characteristic 114 should always maintain the same pressure as the volumetric flow increases, i.e., it should not rise with rising volumetric flow; but that is not possible, in accordance with the earlier explanations, due to static pressure losses resulting from flow forces. In a conventional pressure limiting valve, the previously described flow forces therefore rise in accordance with characteristic 116, and thus characteristic 116 rises with rising volumetric flow. In the valve in accordance with the invention, the volumetric flow now comes into play through the hydraulic resistance 39 or 74 in the form of a restriction characteristic 118. Hence as the volumetric flow 110 increases, the applied system pressure 112 rises accordingly at hydraulic resistance 39 in FIG. 1 or at narrow bore 74 in FIG. 5, resulting in a back pressure which reduces the influence of the flow force and hence causes the characteristic curve to drop again in region 120. At point 122, where restriction characteristic line 118 intersects the pressure characteristic region 120, the second control edge comes into play, so that in the pressure limiting valve in accordance with the invention there is now an additional progression of characteristic 124 approximately parallel to the characteristic 116 of a conventional pressure limiting valve. But it can be seen readily from that diagram that the pattern of the characteristic line 124 of the pressure limiting valve in accordance with the invention at the applied system pressure level remains far below the characteristic curve of a conventional pressure limiting valve, namely the characteristic line 116. Thus, a pressure limiting valve in accordance with the invention is shown whose operating pressure is changed less by the through-flow than in the case of a conventional pressure limiting valve. So the first control edge 41, 76 remains open until the operating pressure of the valve is in the range of the back pressure of restriction 39 or of restriction 74. The applied system pressure, i.e., the infeed pressure, then drops away completely at the restrictions 39, 74, and the first control edge 41, 76 is completely open. In that region the error of the valve is minimal. That means that the operating pressure of the open valve corresponds to the operating pressure of the closed valve shown in FIG. 2*a*, and in fact does so in spite of the volumetric flow passing through the pressure limiting valve.

What is claimed is:

1. A pressure limiting valve, said valve comprising: a spool with spool lands that include spool flow control edges, a housing including a spool-receiving bore for slidably receiving the spool and having axially spaced first and second inflow and outflow grooves that are each connected to a common inlet line and that include respective first and second groove flow control edges for controlling flow within and through the valve, wherein outflows from the first and second grooves flow into a common outfeed line, a hydraulic resistance which is connected in series with a first groove control edge that is adjacent to a first spool control edge of the spool for controlling flow through the first groove, wherein the hydraulic resistance is positioned behind the first groove control edge in the direction of flow, and wherein the second groove control edge and second groove are connected in parallel to the first groove control edge and first groove in the direction of flow through the valve.

2. A valve in accordance with claim 1, wherein the hydraulic resistance is positioned in an outflow line connected with the first groove of the valve.

3. A valve in accordance with claim 1, wherein the hydraulic resistance is an orifice plate.

4. A valve in accordance with claim 1, wherein the second groove control edge in the direction of a valve opening motion of the spool opens later than the first groove control edge.

5. A valve in accordance with claim 1, wherein the hydraulic resistance is a baffle.

6. A valve in accordance with claim 1, wherein the hydraulic resistance is a throttle.

7. A valve in accordance with claim 1, wherein the valve is a slide valve.

8. A valve in accordance with claim 1, wherein the valve is controlled by a pilot pressure.

9. A valve in accordance with claim 1, wherein the spool lands have effective pressure-receiving surfaces of differing areas.

* * * * *